United States Patent
Bae et al.

(10) Patent No.: US 7,916,238 B2
(45) Date of Patent: Mar. 29, 2011

(54) LIQUID CRYSTAL DISPLAY HAVING REFLECTIVE PLATE WITH SIDEWALLS TO IMPROVE BRIGHTNESS

(75) Inventors: Kyu-Han Bae, Suwon-si (KR); Jai-Sang Jung, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 225 days.

(21) Appl. No.: 12/222,050

(22) Filed: Jul. 31, 2008

(65) Prior Publication Data

US 2009/0153767 A1    Jun. 18, 2009

(30) Foreign Application Priority Data

Dec. 12, 2007   (KR) .......................... 10-2007-0129196

(51) Int. Cl.
*G02F 1/1333* (2006.01)
(52) U.S. Cl. ............. 349/58; 349/65; 362/632; 362/633
(58) Field of Classification Search ...................... 349/58
See application file for complete search history.

(56) References Cited

U.S. PATENT DOCUMENTS

| | | | |
|---|---|---|---|
| 5,710,607 A | | 1/1998 | Iwamoto et al. |
| 7,589,803 B2 * | | 9/2009 | Huo et al. ........................ 349/65 |
| 2003/0214718 A1 | | 11/2003 | Kaminsky et al. |
| 2006/0038933 A1 * | | 2/2006 | Hashimoto ...................... 349/58 |
| 2007/0133229 A1 * | | 6/2007 | Tsai ............... 362/633 |
| 2007/0195225 A1 * | | 8/2007 | Lee .................. 349/65 |

FOREIGN PATENT DOCUMENTS

| | | |
|---|---|---|
| JP | 2004-053682 | 2/2004 |
| JP | 2006-235438 | 9/2006 |
| KR | 10-2002-0043942 | 6/2002 |
| KR | 10-2004-0097092 | 11/2004 |
| KR | 1020070004335 A | 1/2007 |
| KR | 100703616 B1 | 3/2007 |
| KR | 1020070041939 A | 4/2007 |
| KR | 10-2007-0088117 | 8/2007 |

OTHER PUBLICATIONS

Office action from European Patent Office issued in Applicant's corresponding European Patent Application No. 08170434.8 dated May 6, 2009.
Korean Office Action dated Oct. 28, 2009, corresponding to the Korean Priority Application No. 10-2007-0129196.
Korean Office Action dated Apr. 29, 2009, corresponding to the Korean Priority Application No. 10-2007-0129196.
Chinese Office Action dated Jan. 8, 2010 of the Chinese Patent Application No. 200810186716X which claims priority of Korean Priority Application No. 10-2007-0129196.
Abstract in English of CN 101067694.

* cited by examiner

*Primary Examiner* — Richard H Kim
(74) *Attorney, Agent, or Firm* — Robert E. Bushnell, Esq.

(57) ABSTRACT

A liquid crystal display design that reduces manufacturing costs and improves optical efficiency. The LCD includes a liquid crystal display panel, a light guide plate arranged on a rear surface of the liquid crystal display panel, a reflective plate that includes a bottom plate and a plurality of sidewalls attached to the bottom plate, the bottom plate of the reflective plate being arranged on a rear surface of the light guide plate to accommodate the light guide plate and the plurality of side walls of the light guide plate extending from the bottom plate to surround sides of the light guide plate and a bottom chassis arranged on a rear side of the reflective plate to accommodate the liquid crystal display panel, the light guide plate, and the reflective plate.

12 Claims, 3 Drawing Sheets

| | BRIGHTNESS OF CONVENTIONAL LCD (cd/m²) | BRIGHTNESS OF LCD ACCORDING TO THE PRESENT INVENTION (cd/m²) |
|---|---|---|
| 1 | 525 | 560 |
| 2 | 531 | 577 |
| 3 | 527 | 585 |
| 4 | 484 | 583 |
| 5 | 515 | 535 |
| 6 | 537 | 545 |
| 7 | 493 | 593 |
| 8 | 539 | 562 |
| 9 | 566 | 574 |
| 10 | 531 | 590 |
| Avg | 525 | 571 |

LIQUID CRYSTAL DISPLAY HAVING REFLECTIVE PLATE WITH SIDEWALLS TO IMPROVE BRIGHTNESS

CLAIM OF PRIORITY

This application makes reference to, incorporates the same herein, and claims all benefits accruing under 35 U.S.C. §119 from an application for LIQUID CRYSTAL DISPLAY earlier filed in the Korean Intellectual Property Office on 12 Dec. 2007 and there duly assigned Serial No. 10-2007-0129196.

BACKGROUND OF THE INVENTION

1. Field of the Invention

A design for a liquid crystal display (LCD) that reduces manufacturing costs while providing improved optical efficiency.

2. Description of the Related Art

Recently, there has been an increase in demand for liquid crystal displays (LCDs) used in portable apparatuses as well as in monitors and TVs due to the LCD's small and light weight design and low power consumption. The LCD includes a liquid crystal display panel, a back light assembly that supplies light to the liquid crystal display panel, and a bottom chassis that accommodates the liquid crystal display panel and the back light assembly. The back light assembly includes various components such as a light emitting diode, a light emitting diode substrate, a light guide plate, a reflective plate, optical sheets, a mold frame including side walls that surround the sides of the light emitting diode, the light emitting diode substrate, the light guide plate, the reflective plate, and the optical sheets. Therefore, the manufacturing costs of the LCD can be large.

In order to reduce the manufacturing costs, the mold frame that is not directly related to supplying light to the liquid crystal display panel, can be removed. When the mold frame is removed, light emitted to the sides of the light guide plate is less apt to be reflected back into the back light, causing the ratio of light re-supplied to the inside of the back light assembly to be remarkably reduced, resulting in reduced optical efficiency. Therefore, what is needed is a design for an LCD where the mold frame may be omitted but where the optical efficiency is not reduced.

SUMMARY OF THE INVENTION

Accordingly, it is an aspect of the present invention to provide a design for a liquid crystal display (LCD) that omits the mold frame to reduce manufacturing costs but also has improved optical efficiency.

According to one aspect of the present invention, there is provided a liquid crystal display (LCD) that includes a liquid crystal display panel, a light guide plate arranged on a rear surface of the liquid crystal display panel, a reflective plate that includes a bottom plate and a plurality of sidewalls attached to the bottom plate, the bottom plate of the reflective plate being arranged on a rear surface of the light guide plate to accommodate the light guide plate and the plurality of side walls of the light guide plate extending from the bottom plate to surround sides of the light guide plate and a bottom chassis arranged on a rear side of the reflective plate to accommodate the liquid crystal display panel, the light guide plate, and the reflective plate.

A height of the side walls of the reflective plate can be larger than or equal to a thickness of the light guide plate. The LCD can also include a plurality of optical sheets arranged between the liquid crystal display panel and the light guide plate, wherein a height of the side walls of the reflective plate can be larger than or equal to a combined thickness of the plurality of optical sheets and the thickness of the light guide plate.

The bottom chassis can include a bottom plate, the light guide plate and the reflective plate can be arranged on the bottom plate and a plurality of first side walls extending from the bottom plate to surround the side walls of the reflective plate. The bottom chassis can also include a plurality of step differences extending from ones of the first side walls to an outside on a plane that runs parallel to the bottom plate and a plurality of second side walls extending from ones of the plurality of step differences, the plurality of second sidewalls extending in an upper direction. The liquid crystal display panel can be arranged on ones of the plurality of step differences.

The LCD can also include a plurality of reinforcing units that extend to an outside of a corresponding ones of the plurality of second walls. Each of the plurality of reinforcing units being bent at least once at an upper part of ones the second side walls.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Here, embodiments of the present invention will be described in detail with reference to the attached drawings.

Figure 1:
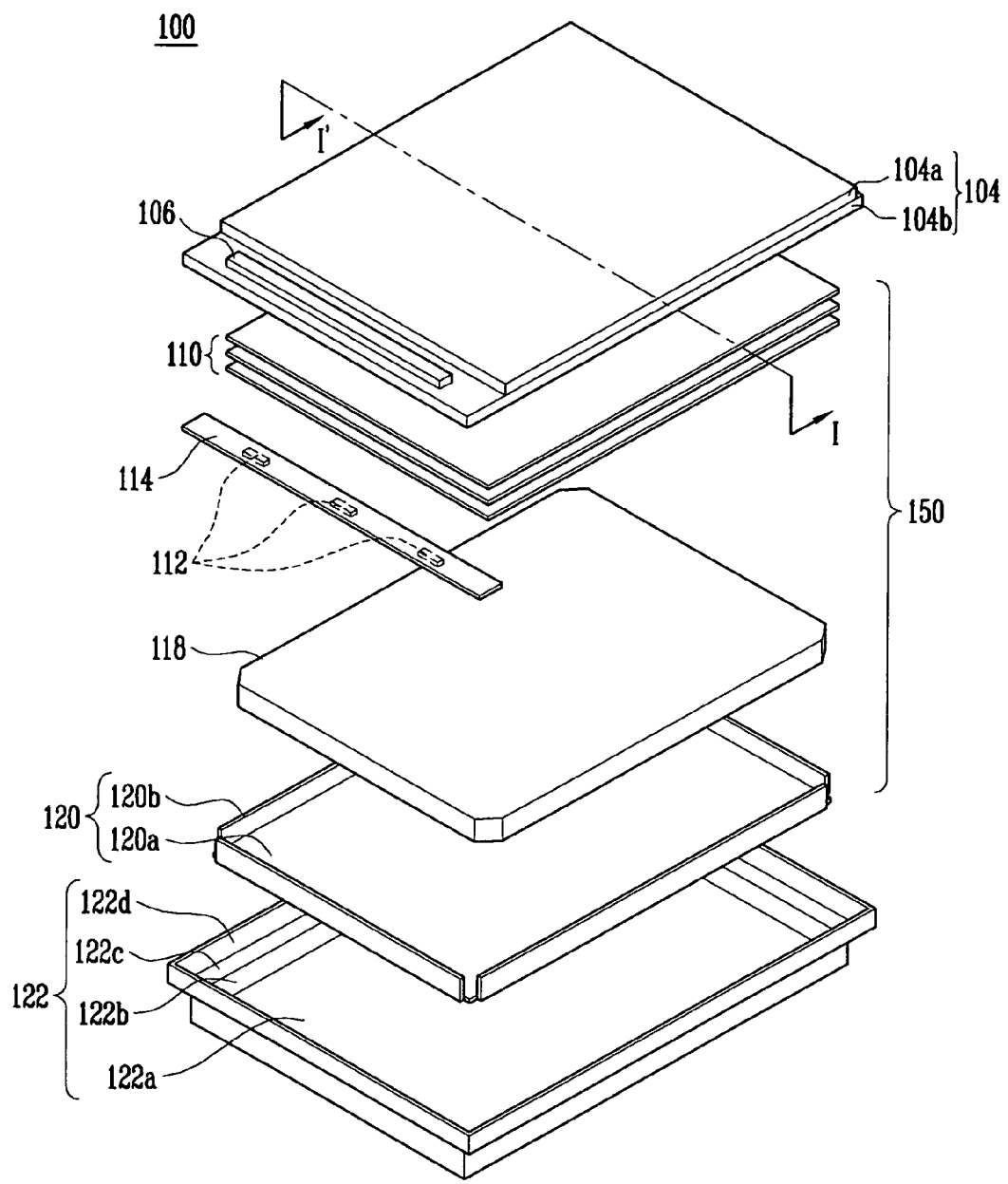
FIG. 1 is an exploded perspective view illustrating a liquid crystal display (LCD) according to an embodiment of the present invention.
Figure 2:
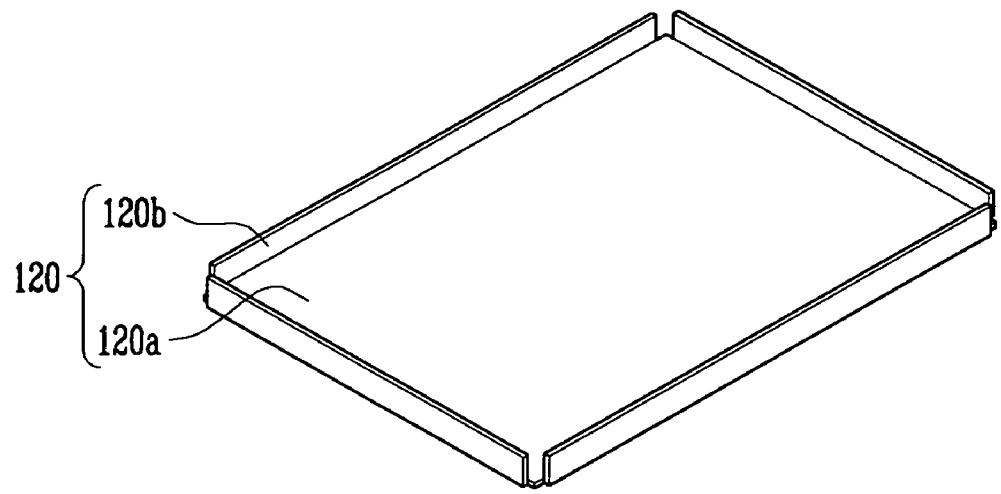
FIG. 2 is a perspective view illustrating the reflective plate of FIG. 1.
Figure 3:
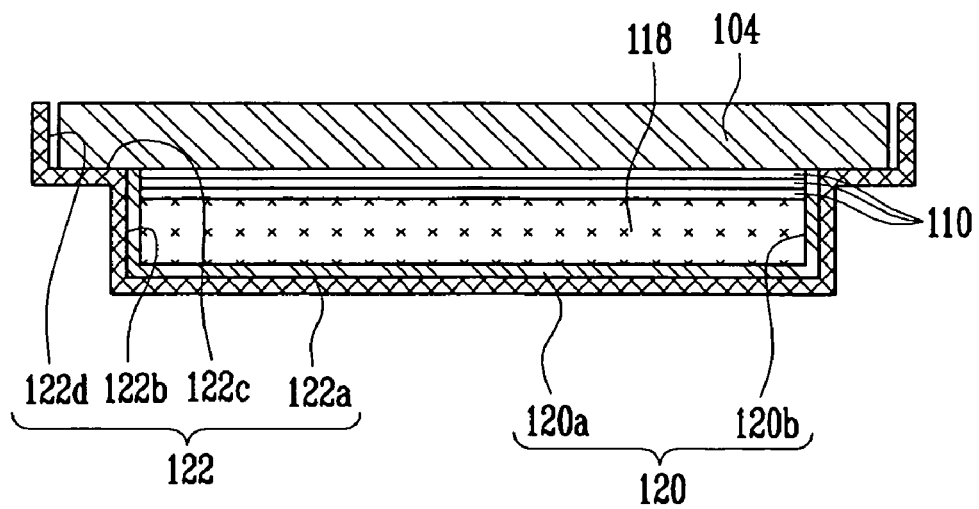
FIG. 3 is a sectional view illustrating the section of the LCD taken along the line I-I' of FIG. 1.
Figures 4, 5:
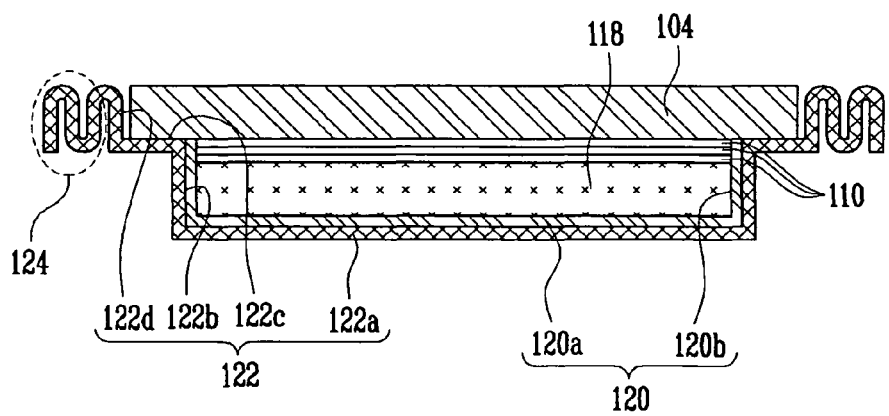
FIG. 4 is a table that compares the brightness of a conventional LCD with the brightness of the LCD according to the present invention.
FIG. 5 is a modified design of the LCD of FIG. 1 where a reinforcing unit is included in the bottom chassis.

Turning now to the figures, FIG. 1 is an exploded perspective view illustrating a liquid crystal display (LCD) 100 according to an embodiment of the present invention, FIG. 2 is a perspective view illustrating the reflective plate 120 of the LCD 100 of FIG. 1, FIG. 3 is a sectional view illustrating the section of the LCD 100 taken along the line I-I' of FIG. 1 and FIG. 4 is a table of data that compares the brightness of a conventional LCD with the brightness of the LCD 100 according to the present invention.

Referring to FIGS. 1 through 3, an LCD 100 according to the present embodiment includes a liquid crystal display panel 104, a back light assembly 150, and a bottom chassis (or a bezel) 122. The liquid crystal display panel 104 includes a first substrate 104a, a second substrate 104b, and liquid crystal (not shown) injected between the first substrate 104a and the second substrate 104b. The liquid crystal display panel 104 displays an image corresponding to a driving signal supplied from an integrated circuit 106 mounted on one side of the second substrate 104b.

The back light assembly 150 includes light emitting diodes 112, a light emitting diode substrate 114, a light guide plate 118, a reflective plate 120, and optical sheets 110. The light emitting diodes 112 generate light with predetermined brightness in response to the driving signal supplied from the light emitting diode substrate 114. The light emitting diode substrate 114 supplies the driving signal to the light emitting diodes 112 in response to a control signal supplied from the outside.

The light guide plate 118 is provided on the rear surface of the liquid crystal display panel 104 and supplies light produced by the light emitting diodes 112 to the liquid crystal display panel 104. The light guide plate 118 receives light from the light emitting diodes 112 at the sides thereof and supplies this light to the liquid crystal display panel 104 arranged thereon.

The reflective plate 120 includes a bottom plate 120a on which the light guide plate 118 is arranged and side walls 120b that extend from the bottom plate 120a in an upper perpendicular direction to surround the sides of the light guide plate 118. The reflective plate 120 accommodates the light guide plate 118 on a top surface of the bottom plate 120a.

The height of the side walls 120b of the reflective plate 120 is larger than or equal to the thickness of the light guide plate 118. Therefore, light emitted from the sides of the light guide plate 118 can be reflected back into the light guide plate 118. In the LCD 100 of the present invention, the side walls 120b are included in the reflective plate 120 to improve optical efficiency. In particular, since the reflective plate 120 has a higher reflectance than the conventional mold frame, even with the mold frame omitted, higher optical efficiency can be achieved over that of the conventional art, even with the mold frame omitted. Therefore, an LCD 100 with improved brightness can be provided.

Furthermore, the side walls 120b of the reflective plate 120 fill spaces between the sides of the light guide plate 118 and the bottom chassis 122 so that a stable optical characteristic can be obtained. In addition, the height of the side walls 120b of the reflective plate 120 can be set to be equal to or greater than the combined thicknesses of the light guide plate 118 and the optical sheets 110 in order to maximize the optical efficiency of the back light assembly 150. By designing the height of the sidewalls 120b this way, the side walls 120b of the reflective plate 120 can be formed to surround the sides of the optical sheets 110 when the optical sheets 110 are laminated onto the light guide plate 118. The optical sheets 110 are positioned between the liquid crystal display panel 104 and the light guide plate 118 and serve to improve the brightness of light supplied from the light guide plate 118 and to deliver this light to the liquid crystal display panel 104.

The bottom chassis 122 is made out of a metal that has a large strength and is positioned under the reflective plate 120 to accommodate the liquid crystal display panel 104 and the back light assembly 150. More specifically, the bottom chassis 122 includes a bottom plate 122a, first side walls 122b, step differences 122c, and second side walls 122d. The optical sheets 110, the light guide plate 118 and the reflective plate 120 are arranged on the bottom plate 122a. The first side walls 122b extend from the bottom plate 122a in an upper perpendicular direction to surround the side walls 120b of the reflective plate 120. Then, the step differences 122c are extended from the first side walls 122b to the outside in a perpendicular direction and are provided on a plane that runs parallel with the bottom plate 120a so that the liquid crystal display panel 104 can rest thereon. In addition, the second side walls 122d are extended from the step differences 122c and are bent in an upper perpendicular direction to surround the sides of the liquid crystal display panel 104.

As described above, when the optical sheets 110, the light guide plate 118, and the reflective plate 120 are stably accommodated within the internal space created by the bottom plate 122a and the first side walls 122b of the bottom chassis 122, the mold frame can be omitted. In the above-described LCD 100 according to the present embodiment, the mold frame is omitted to reduce the manufacturing costs of the LCD 100 and to provide a slimmer design for the LCD 100. In addition, since the back light assembly 150 is inserted into the bottom chassis 122 and since the back light assembly is made out of a metal having a large strength, the resulting LCD 100 has a strength that is even greater than that of the conventional art. Further, in the LCD 100 according to the embodiments of the present invention, the reflective plate 120 having the side walls 120b that surrounds the sides of the light guide plate 118 is provided to improve optical efficiency. Therefore, it is possible to improve the brightness of an image displayed of the liquid crystal display panel 104.

Turning now to FIG. 4, FIG. 4 is a table of empirical data comparing the brightness of a conventional LCD in which the mold frame is included and where side walls are not provided in the reflective plate to the brightness of the LCD 100 according to the present invention where the mold frame is omitted and where the side walls 120b are provided in the reflective plate 120. As can be seen from the data of FIG. 4, the brightness of the LCD 100 according to the present invention is 10% greater on the average over that of the conventional LCD.

In FIG. 4, LCDs used for measuring brightness were for two inches (that is, the horizontal and vertical sizes of an active region are 30.6 mm and 40.8 mm, respectively) and 10 modules were used for each of the conventional LCD and the LCD according to the present invention. In the LCDs used for measuring the brightness, conditions such as a panel size and a light emitting diode are set to be the same.

In an alternative embodiment according to the present invention, in order to further improve the strength of the LCD 100, the structure of the bottom chassis 122 can vary. For example, FIG. 5 is a sectional view illustrating the section of an LCD in which a reinforcing units 124 are included in the bottom chassis 122 of FIGS. 1 and 3. As illustrated in FIG. 5, reinforcing units 124 that extend to the outside of the second side walls 122d of the bottom chassis 122 can be further provided. The reinforcing units 124 are bent at least once at the upper parts of the second side walls 122d to improve the strength of the LCD 100. By including the reinforcing units 124 in the bottom chassis 122, shock applied from the outside is released by the reinforcing units 124 so that the liquid crystal display panel 104 can be better protected.

In the present invention, an LCD omits the mold frame and includes sidewalls on the reflective plate, providing a design that is slimmer, less expensive to make, and that produces a brighter image. However, the present invention is not limited to the above. For example, in an alternative embodiment of the present invention, the side walls are formed in the reflective plate of the LCD into which the mold frame is inserted to improve optical efficiency. In this embodiment, the step differences may not be formed in the bottom chassis.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display (LCD), comprising:
a liquid crystal display panel;
a light guide plate arranged on a rear surface of the liquid crystal display panel;
a reflective plate that includes a bottom plate and a plurality of sidewalls attached to the bottom plate, the bottom plate of the reflective plate being arranged on a rear surface of the light guide plate to accommodate the light guide plate, the plurality of side walls of the reflective plate extending from the bottom plate to surround sides of the light guide plate; and
a bottom chassis arranged on a rear side of the reflective plate to accommodate the liquid crystal display panel, the light guide plate, and the reflective plate, the bottom chassis being comprised of metal, the LCD being absent of a mold frame, the bottom chassis comprising:
a bottom plate, the light guide plate and the reflective plate being arranged on the bottom plate;
a plurality of first side walls extending from the bottom plate to surround the side walls of the reflective plate;
a plurality of step differences, each extending from a corresponding one of the first side walls to an outside of the light guide plate and the reflective plate and extending away from said light guide plate and the reflective plate, each of the first sidewalls being attached to a first end of a corresponding one of the step differences; and
a plurality of second side walls, each extending from a second and opposite end of a corresponding one of the plurality of step differences, the plurality of second sidewalls extending in an upper direction away from said bottom plate, each of the plurality of second side walls being on a plane that runs parallel to each of the plurality of first sidewalls, each of the plurality of second side walls being further from the bottom plate than the plurality of first side walls.

2. The LCD of claim 1, wherein a height of the side walls of the reflective plate being larger than or equal to a thickness of the light guide plate.

3. The LCD of claim 1, further comprising a plurality of optical sheets arranged between the liquid crystal display panel and the light guide plate, wherein a height of the side walls of the reflective plate are larger than a combined thickness of the plurality of optical sheets and the thickness of the light guide plate.

4. The LCD of claim 1, wherein the bottom chassis comprises:
a bottom plate, the light guide plate and the reflective plate being arranged on the bottom plate; and
a plurality of first side walls extending from the bottom plate to surround the side walls of the reflective plate.

5. The LCD of claim 1, wherein the liquid crystal display panel is arranged on each of the plurality of step differences.

6. The LCD of claim 1, further comprising a plurality of reinforcing units, each extending to an outside of a corresponding one of the plurality of second walls and being integral with the bottom chassis.

7. The LCD of claim 1, wherein each of the plurality of reinforcing units is bent a plurality of times at an upper part of a corresponding one of the second side walls.

8. A liquid crystal display (LCD), comprising:
a liquid crystal display panel;
a light guide plate arranged on a rear surface of the liquid crystal display panel;
a reflective plate that includes a bottom plate and a plurality of sidewalls attached to the bottom plate, the bottom plate of the reflective plate being arranged on a rear surface of the light guide plate to accommodate the light guide plate, the plurality of side walls of the reflective plate extending from the bottom plate to surround sides of the light guide plate; and
a bottom chassis arranged on a rear side of the reflective plate to accommodate the liquid crystal display panel, the light guide plate, and the reflective plate, the bottom chassis comprises:
a bottom plate, the light guide plate and the reflective plate being arranged on the bottom plate;
a plurality of first side walls extending from the bottom plate to surround the side walls of the reflective plate;
a plurality of step differences, each extending from a corresponding one of the first side walls to an outside on a plane that runs parallel to the bottom plate; and
a plurality of second side walls, each extending from a corresponding one of the plurality of step differences, the plurality of second sidewalls extending in an upper direction.

9. The LCD of claim 8, wherein the liquid crystal display panel is arranged on each of the plurality of step differences.

10. The LCD of claim 8, further comprising a plurality of reinforcing units, each extending to an outside of a corresponding one of the plurality of second walls and being integral with the bottom chassis.

11. The LCD of claim 10, wherein each of the plurality of reinforcing units being bent a plurality of times at an upper part of a corresponding one of the second side walls.

12. The LCD of claim 8, each of the plurality of step differences having a first end and a second and opposite end, each first end of each step difference being attached to a corresponding one of said first walls and each second end being attached to a corresponding one of said second walls.

* * * * *